(12) United States Patent
Lee

(10) Patent No.: US 7,439,793 B2
(45) Date of Patent: Oct. 21, 2008

(54) CHARGE PUMP CIRCUITS AND METHODS FOR THE SAME

(75) Inventor: Seung-Won Lee, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 46 days.

(21) Appl. No.: 11/270,648

(22) Filed: Nov. 10, 2005

(65) Prior Publication Data

US 2006/0132220 A1 Jun. 22, 2006

(30) Foreign Application Priority Data

Dec. 20, 2004 (KR) .................... 10-2004-0108826

(51) Int. Cl.
*G05F 1/10* (2006.01)
*G05F 3/02* (2006.01)

(52) U.S. Cl. .................................... 327/536

(58) Field of Classification Search ............... 327/536
See application file for complete search history.

(56) References Cited

U.S. PATENT DOCUMENTS

| | | | | |
|---|---|---|---|---|
| 5,140,182 A * | 8/1992 | Ichimura | ............ | 327/536 |
| 6,008,690 A * | 12/1999 | Takeshima et al. | ............ | 327/534 |
| 6,154,088 A | 11/2000 | Chevallier et al. | | |
| 6,545,529 B2 | 4/2003 | Kim | ............ | 327/536 |
| 6,690,227 B2 * | 2/2004 | Lee et al. | ............ | 327/536 |
| 6,717,459 B2 | 4/2004 | Blodgett | ............ | 327/536 |
| 7,116,154 B2 * | 10/2006 | Guo | ............ | 327/536 |
| 2002/0000870 A1 * | 1/2002 | Li et al. | ............ | 327/536 |
| 2002/0190780 A1 * | 12/2002 | Bloch | ............ | 327/536 |

FOREIGN PATENT DOCUMENTS

| | | |
|---|---|---|
| CN | 1331862 | 1/2002 |
| DE | 101 57 997 | 1/2003 |
| KR | 10-0366636 | 12/2002 |

OTHER PUBLICATIONS

German Office Action dated May 30, 2007 for counterpart German Patent Application No. 10 2005 062 526.6-34 is provided for the purposes of certification under 37 C.F.R. §§ 1.97(e) and 1.704(d).
"Charge Sharing Concept and New Clocking Scheme for Power Efficiency and Electromagnetic Emission Improvement of Boosted Charge Pumps," by Christi Lauterbach et al. published in IEEE Journal of Solid-State Circuits, vol. 35, No. 5, May 2000.
Chinese Patent Office Action dated Jun. 13, 2008.

* cited by examiner

*Primary Examiner*—Quan Tra
(74) *Attorney, Agent, or Firm*—Harness, Dickey & Pierce

(57) ABSTRACT

A charge pump circuit may include a plurality of charge pump cells. Each charge pump cell may further include an output node for supplying charge, a pumping node for receiving a clock signal and a pumping capacitor, which may be connected between the output node and the pumping node, for storing the charge and may repeat a charge or discharge operation and/or a pre-charge operation in response to a plurality of clock signals. In the pre-charge operation, a unidirectional charge supply may be performed from a lower voltage output node to a higher voltage output node.

29 Claims, 10 Drawing Sheets

CHARGE PUMP CIRCUITS AND METHODS FOR THE SAME

PRIORITY STATEMENT

This non-provisional U.S. application claims priority under 35 U.S.C. § 119 to Korean Patent Application No. 10-2004-0108826, filed on Dec. 20, 2004, in the Korean Intellectual Property Office (KIPO), the disclosure of which is incorporated herein in its entirety by reference.

BACKGROUND OF THE INVENTION

1. Field of the Invention

Example embodiments of the present invention relate to charge pump circuits and methods for the same.

2. Description of the Related Art

Related art charge pump circuits may charge a capacitor at one node using a driver while concurrently discharging a capacitor at a neighboring node. In these related art charge pump circuits, charge consumption may be proportional to the product of a capacitance and a supply voltage, and may be reduced by charging through one node, pre-discharging (or pre-charging) through the neighboring node before discharging through a ground node, and completing the discharge through the ground node after disconnecting from the neighboring node.

If charge pumping is performed by alternating the charge operation with the pre-charge operation, the pre-charge may first be performed from the node in the charge operation, the remaining charge may then be provided from an external voltage source, and the amount of charge consumed in the charge operation may be reduced.

FIG. 1 is a block diagram of a related art voltage generation circuit 10. Referring to FIG. 1, the voltage generation circuit 10 may include an oscillator 11, a clock generator 12, a charge pump circuit 13 and a regulator 14. The oscillator (e.g., a ring oscillator) 11 may generate an oscillation signal OSC for triggering an operation of the clock generator 12, which may be enabled (e.g., started, triggered, etc.) by an enable signal EN. The clock generator 12 may be triggered by the oscillation signal OSC, and may generate clock signals for controlling the operation of the charge pump circuit 13. The charge pump circuit 13 may include a plurality of charge pump cells and may perform a charge pumping operation by alternating a charge and discharge operation based on the clock signals output from the clock generator 12 to output a higher voltage for a semiconductor circuit. The regulator 14 may output a reset signal RST for deactivating (e.g., turning off) the oscillator 11, for example, when the voltage output from the charge pump circuit 13 reaches a threshold level (e.g., a desired level). The regulator 14 may control the operation of the oscillator 11 such that the output voltage of the charge pump circuit 13 may reach the threshold level (e.g., desired level).

FIG. 2 is a circuit diagram of a related art charge pump circuit 20. FIG. 3 is a timing diagram of clock signals for driving the related art charge pump circuit 20 shown in FIG. 2.

FIG. 2 illustrates a portion of a plurality of charge pump cells of the related art charge pump circuit 20. The charge pump circuit 20 may generate a higher voltage by pumping charge using the charge pump cells connected in series as shown in FIG. 2. Referring to FIG. 2, the charge pump circuit 20 may pull-up charge input through a capacitor (e.g., a pumping capacitor) Cp for charge pumping to a higher voltage and may output the pull-up voltage to a next cell. For example, when the charge pump circuit 20 drives the capacitor Cp connected to a voltage output node N(i) of an ith cell to a higher voltage using a charge clock signal nPh1 and pulls up a switching clock signal Ph1a to a higher level, charge from the voltage output node N(i) of the ith cell may move to an output node N(i+1) of an (i+1)th cell. The capacitor Cp, a first parasitic capacitor Cc and a second parasitic capacitor Cs may be driven by charge clock signals nPh1 and nPh2. The first parasitic capacitor Cc may have a parasitic capacitance of the capacitor Cp when the pumping capacitor Cp operates, and the second parasitic capacitor Cs may have another capacitance (e.g., a stray capacitance), which may also be the parasitic capacitance of each node.

The amount of charge consumed when the charge pumping is performed in the charge pump circuit 20 may be on average Vdd×(Cp+Cc)×N, where N denotes the number of charge pump cells. The charge pumping efficiency E is E=Q_load/Q_consumed={Cp/(Cp+Cs)×(N+1)×Vdd−V_target}/{N2×Vdd×(Cp+Cc)}, where Q_load denotes the amount of charge supplied to a load, for example, the output node, Q_consumed denotes the amount of charge consumed in the pumping operation, Vdd denotes an input voltage, V_target denotes an output voltage of the load, and N denotes the number of charge pump cells.

The first and second parasitic capacitors Cc and Cs may be removed to increase (e.g., maximize) the charge pumping efficiency E. The capacitance of the first and second parasitic capacitors Cc and Cs may be determined by a charge supplying scheme and by the configuration of the pumping capacitor Cp.

In related art charge pumping methods, charge used to charge the pumping capacitor Cp may be subsequently discharged. In order to reduce the amount of charge discharged and increase the charge pumping efficiency E, related art charge pump circuits may share charge in one pumping capacitor with a neighboring capacitor before discharging the pumping capacitor.

FIG. 4 is a circuit diagram of a related art charge pump circuit 40 capable of distributing charge. FIG. 5 is a timing diagram of clock signals for driving the charge pump circuit 40 shown in FIG. 4.

When the charge pump circuit 40 charges or discharges an output node N(i) of an ith cell and an output node N(i+1) of an (i+1)th cell using the clock signals shown in FIG. 5, the charge pump circuit 40 may reduce the consumption of charge by sharing the initial charge at each node and charging or discharging to compensate for the shortage or excess of charge. For example, when the clock of a pumping capacitor Cp connected to the output node N(i) of the ith cell is 0V and the clock of a pumping capacitor Cp connected to the output node N(i+1) of the (i+1)th cell is Vdd, the charge of the pumping capacitors connected to the output node N(i) and the output node N(i+1) may be shared by enabling a pre-charge clock signal Ph3 to Vdd, before the pumping capacitor Cp connected to the output node N(i) is charged and the pumping capacitor Cp connected to the output node N(i+1) is discharged. In the related art, pre-charging may increase the voltage of the output node N(i) to Vdd/2 by sharing the charge with the neighboring node N(i+1), and the voltage of the output node N(i+1) may decrease to Vdd/2. By supplying Vdd to the pumping capacitor Cp connected to the output node N(i), and 0V to the pumping capacitor Cp connected to the output node N(i+1), after disabling the pre-charge clock signal Ph3 to 0V, the pumping capacitor Cp connected to the output node N(i) may be charged from Vdd/2 to Vdd, the pumping capacitor Cp connected to the output node N(i+1)"

may be discharged from Vdd/2 to 0V, and the charge pump circuit 40 may consume a reduced amount of charge.

The related art charge pump circuit 40 may suppress the inversely flowing charge from the output node N(i+1) to the output node N(i) by keeping a charge supply transistor 42 inactive (e.g., off) during pre-charging.

FIG. 6 illustrates a related art charge pump circuit 60 during a pre-charge operation.

In the related art charge pump circuit 60 shown in FIG. 6, the pumping capacitor Cp may be connected in series with the second parasitic capacitor Cs. The amount of charge shared to each node may be $Vdd/2 \times [Cc+\{Cp \times Cs/(Cp+Cs)\}]$. In the related art, the capacitance of the second parasitic capacitor Cs of each node of the charge pump circuit 60 may decrease the pumping efficiency. Further, since the capacitance of the parasitic capacitors Cc and Cs is smaller relative to the pumping capacitor Cp, the amount of shared charge is $Vdd/2 \times (Cc+Cs)$ and the increase in pumping efficiency may be limited (e.g., insubstantial).

SUMMARY OF THE INVENTION

Example embodiments of the present invention provide charge pump circuits, which may generate higher voltages, suppress charge consumption and/or increase the amount of charge pre-charged in a pre-charge operation in the charge pump circuit for generating a higher voltage, for example, by alternating a charge operation with the pre-charge operation.

Example embodiments of the present invention provide charge pump circuits which may have increased pumping efficiency, for example, by increasing the amount of charge supplied in a pre-charge operation.

In an example embodiment of the present invention, a charge pump circuit may include a plurality of charge pump cells. Each of the plurality of charge pump cells may comprise a first output node, a first pumping node, and a capacitor. The first output node may transfer charge, and the first pumping node may receive a clock signal. The capacitor may be connected between the first output node and the first pumping node, may store a charge, and may repeat a charge, discharge or pre-charge operation in response to a plurality of clock signals. The pre-charge operation may include a unidirectional charge transfer performed from the first output node to a second output node, the second output node having a higher voltage than the first output node.

Another example embodiment of the present invention provides a method, which may comprise activating a connection between a first pumping node in a first charge pump cell and a second pumping node in a second charge pump cell in response to a pre-charge enable clock signal, varying the voltage of a first output node by charging a first pumping capacitor using charge transferred through the first pumping node, activating a connection between a first output node in the first charge pump cell and a first output node in the second charge pump cell when the first and second output nodes have equal voltages, and transferring the charge through the first and second output nodes.

Another example embodiment of the present invention provides a charge pump cell. The charge pump cell may include a first output node, a first pumping node and a capacitor. The first output node may transfer charge, and the first pumping node may receive a clock signal. The capacitor may be connected between the first output node and the first pumping node, may store the charge, and may repeat a charge, discharge or pre-charge operation in response to a plurality of clock signals. The pre-charge operation may include a unidirectional charge transfer performed from the first output node to a second output node, the second output node having a higher voltage than the first output node.

In example embodiments of the present invention, the charge transfer may be performed by activating a connection between the first output node and the second output node when the voltage of the first output node is equal to the voltage of the second output node.

In example embodiments of the present invention, a connection between the first output node and the second output node may be deactivated during the charge and discharge operation.

In example embodiments of the present invention, the first pumping node and a second pumping node may be connected using a switch, which may be activated in the pre-charge operation and deactivated in the charge and discharge operations.

In example embodiments of the present invention, the switch may include a transistor which responds to a clock signal enabled in the pre-charge operation.

In example embodiments of the present invention, the first output node may be connected to the second output node using a transistor whose gate may be connected to the first output node.

Example embodiments of the present invention may perform the charge and/or discharge operations in response to a pumping clock signal input to the first pumping node, and may perform the pre-charge operation in response to a pre-charge clock signal input to the switch.

In example embodiments of the present invention, at least one of the plurality of charge pump cells may further include a first transistor and a second transistor. The first transistor may be connected between the first pumping node and a second pumping node and may respond to a clock signal enabled during the pre-charge operation. The second transistor may be connected between the first output node and the second output node and may have a gate connected to the first output node.

In example embodiments of the present invention, at least one of the plurality of charge pump cells may further include a third transistor connected between the first output node and a gate of the second transistor, and a second capacitor may be connected to the gate of the second transistor In example embodiments of the present invention, at least one of the plurality of charge pump cells may further include a first transistor connected between the first pumping node and a second pumping node. The first transistor may respond to a clock signal enabled in the pre-charge operation. A second transistor may be connected between the first output node and the second output node, and a second capacitor may be connected to a gate of the second transistor. A third transistor and a fourth transistor may be connected in series between the gate of the second transistor and the second output node, and a fifth transistor may be connected between a gate of the fourth transistor and the second output node. A third capacitor may be connected to the gate of the fourth transistor, a gate of the third transistor may be connected to the first output node, and a gate of the fifth transistor may be connected to the gate of the fourth transistor.

In example embodiments of the present invention, at least one of the plurality of charge pump cell may further include a first transistor connected between the first pumping node and a second pumping node. The first transistor may respond to a clock signal enabled in the pre-charge operation. A second transistor may be connected between the first output node and the second output node, and a second capacitor may be connected to a gate of the second transistor. A third transistor and a fourth transistor may be connected in series between the gate of the second transistor and the second output node, and a fifth transistor may be connected between a gate of the fourth transistor and the second output node. A third capacitor may be connected to the gate of the fourth transistor. A gate of the third transistor may be connected to the gate of the second transistor, and a gate of the fifth transistor may be connected to the gate of the fourth transistor.

Example embodiments of the present invention may further include disabling the pre-charge enable signal, and charging or discharging the pumping capacitor in response to the pumping clock signal.

In example embodiments of the present invention, any or all of the transistors may be PMOS or NMOS transistors.

BRIEF DESCRIPTION OF THE DRAWINGS

Example embodiments of the present invention will become more apparent by describing in detail the attached drawings in which.

DETAILED DESCRIPTION OF EXAMPLE EMBODIMENTS OF THE PRESENT INVENTION

Example embodiments of the present invention will now be described in detail with reference to the accompanying drawings. Like reference numbers refer to like elements through the drawings.

Figure 1:
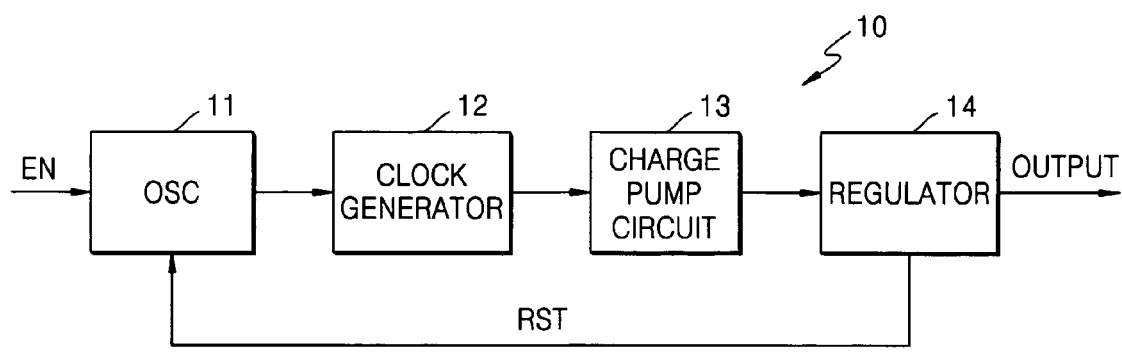
FIG. 1 is a block diagram of a related art voltage generation circuit.
Figure 2:
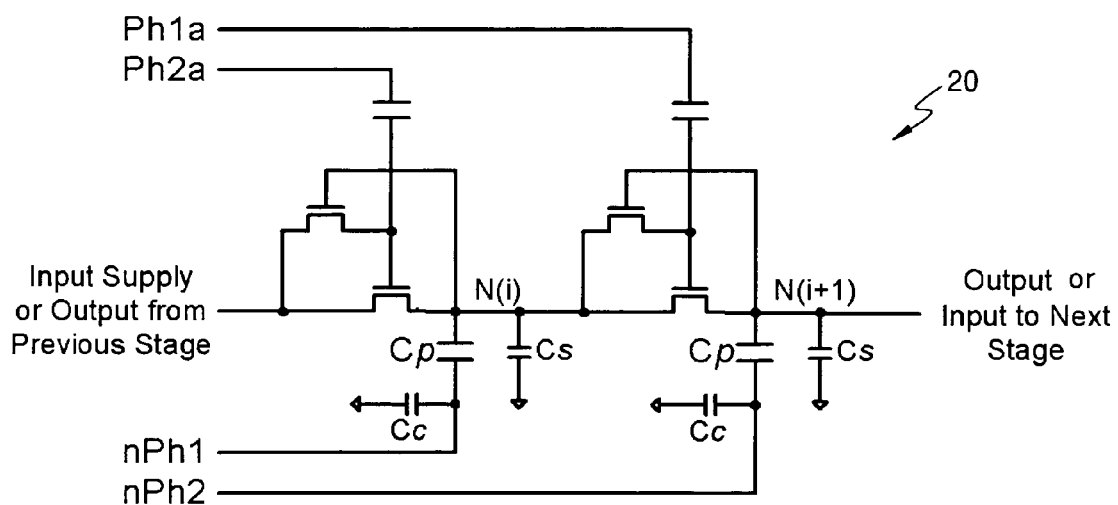
FIG. 2 is a circuit diagram of a related art charge pump circuit.
Figure 3:
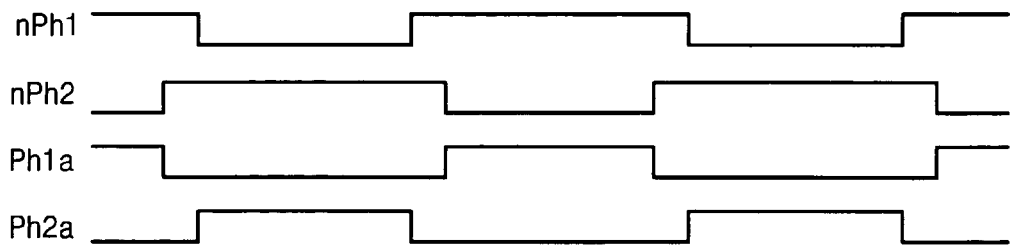
FIG. 3 is a timing diagram of clock signals for driving the related art charge pump circuit shown in FIG. 2.
Figure 4:
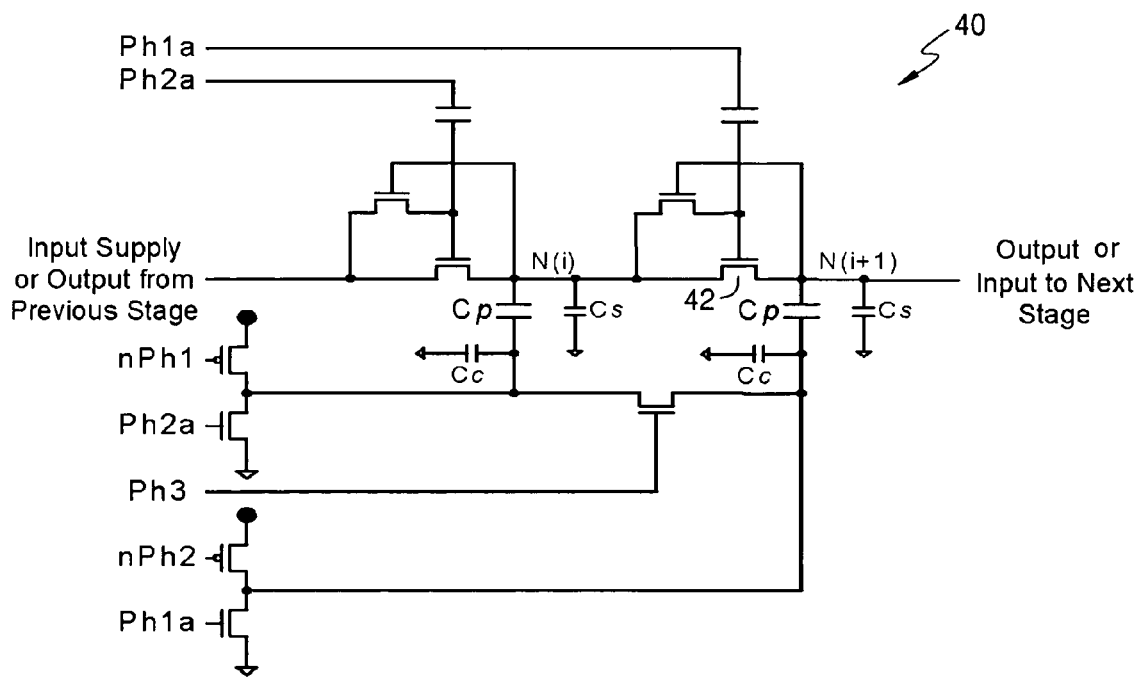
FIG. 4 is a circuit diagram of another related art charge pump circuit.
Figure 5:
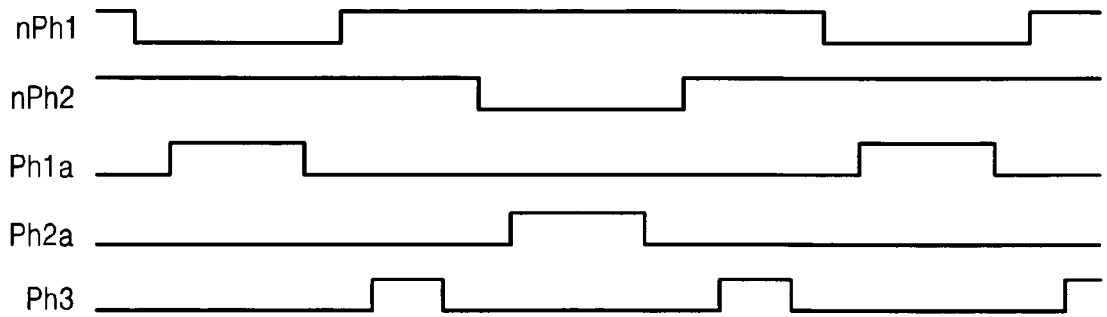
FIG. 5 is a timing diagram of clock signals for driving the related art charge pump circuit shown in FIG. 4.
Figure 6:
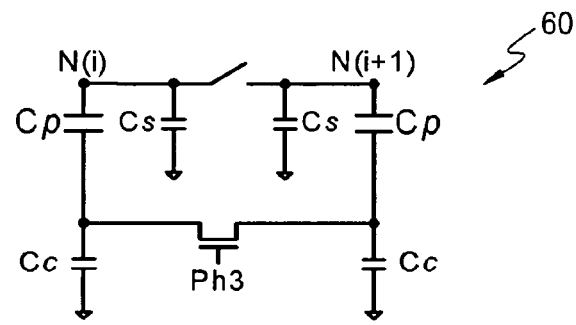
FIG. 6 illustrates another related art charge pump circuit.
Figure 7:
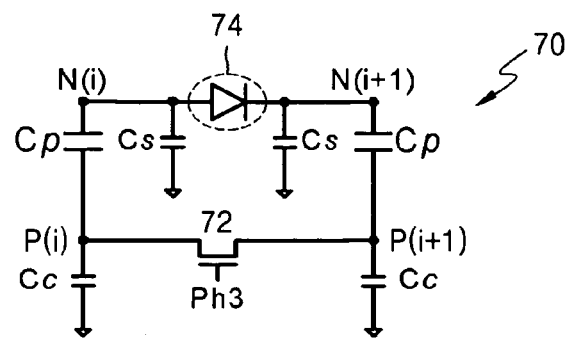
FIG. 7 is a circuit diagram illustrating a charge pump circuit according to an example embodiment of the present invention.

FIG. 7 is a circuit diagram illustrating a charge pump circuit according to an example embodiment of the present invention.

FIG. 7 illustrates an example charge pump circuit 70 in which a transistor 72 connected between a pumping node P(i) of an ith cell and a pumping node P(i+1) of an (i+1)th cell is active (e.g., in an ON state). A diode 74 may be connected between an output node N(i) of the ith cell and an output node N(i+1) of the (i+1)th cell. In an example pre-charge operation, the connection between the output node N(i) of the ith cell and the output node N(i+1) of the (i+1)th cell may be inactive (e.g., in an OFF state), for example, when the voltage of the output node N(i) of the ith cell is less than the voltage of the output node N(i+1) of the (i+1)th cell, and may be active (e.g., ON), for example, when the voltage of the output node N(i) of the ith cell is greater than, or equal to, the voltage of the output node N(i+1) of the (i+1)th cell.

In the circuit of FIG. 7, the voltage of the output node N(i) may be Vpp−α and the voltage of the output node N(i+1) may be Vpp, for example, when the level of a clock of a pumping capacitor Cp of the ith cell is 0V and the level of a clock of a pumping capacitor Cp of the (i+1)th cell is Vdd. If a pre-charge clock signal Ph3 is enabled and the pumping node P(i) is connected to the pumping node P(i+1), the voltage of the pumping node P(i) may increase from 0V to Vdd/2, and the voltage of the pumping node P(i+1) may decrease from Vdd to Vdd/2. The voltage of the output node N(i) may increase, for example, by an amount equal to the amount of charge in response to the voltage increase of the pumping node P(i), and the voltage of the output node N(i+1) may decrease in response to the voltage decrease of the pumping node P(i+1). If the voltage of the output node N(i) increases and the voltage of the output node N(i+1) decreases, the voltage of the output node N(i) of the ith cell may become greater than the voltage of the output node N(i+1) of the (i+1)th cell, and the connection between the two output nodes N(i) and N(i+1) may be active. The two output nodes N(i) and N(i+1) may maintain the same, or substantially the same, voltage, for example, since charge of the output node N(i) may be transferred to the output node N(i+1).

For example, the pumping voltages of the pumping nodes P(i) and P(i+1) may be 2V, the voltage of the output node N(i) may be 7V, and the voltage of the output node N(i+1) may be 8V after a charge pumping (e.g., a first charge pumping).

In another example pre-charge operation, the voltage of the pumping node P(i) may increase from 0V to 1V and the voltage of the pumping node P(i+1) may decrease from 2V to 1V. If the voltage of the output node N(i) is less than the voltage of the output node N(i+1), for example, when the voltage of the pumping node P(i) is 0V and the voltage of the pumping node P(i+1) is 2V, the diode 74 may be inactive (e.g., in the OFF state) during the pre-charge operation. When the voltage of the pumping node P(i) becomes, for example, 0.5V, the voltage of the pumping node P(i+1) may be 1.5V, the voltage of the output node N(i) may be 7.5V, and the voltage of the output node N(i+1) may be 7.5V. In example embodiments of the present invention, the voltages of the output nodes N(i) and N(i+1) may be equal, or substantially equal, and the connection between the two output nodes N(i) and N(i+1) may be active.

When the voltage of the pumping node P(i) increases by 0.25V to 0.75V and the voltage of the pumping node P(i+1) decreases by 0.25V to 1.25V, the voltage of the output node N(i) may be 7.75V, and the voltage of the output node N(i+1) may be 7.25V, for example, due to the change of 0.25V. In this example, since the connection between the two output nodes N(i) and N(i+1) is active, the voltages of the output nodes N(i)

and N(i+1) may be maintained 7.5V, for example, by transferring charge of the output node N(i) to the output node N(i+1).

When the voltage of the pumping node P(i) increases by 0.25V to 1V and the voltage of the pumping node P(i+1) decreases by 0.25V to 1V, the voltage of the output node N(i) may be 7.75V, and the voltage of the output node N(i+1) may be 7.25V, for example, due to the change of 0.25V. In this example, since the connection between the two output nodes N(i) and N(i+1) is active, the voltages of the output nodes N(i) and N(i+1) may be maintained at 7.5V, for example, by transferring charge of the output node N(i) to the output node N(i+1).

In example embodiments of the present invention, a charge pumping operation may be performed by deactivating (e.g., turning off) the transistor 72 connected between the two pumping nodes P(i) and P(i+1). The transistor 72 may be deactivated by disabling the pre-charge clock signal Ph3, charging the pumping capacitor Cp connected to the output node N(i), for example, by increasing the voltage of the pumping node P(i), and discharging the pumping capacitor Cp connected to the output node N(i+1), for example, by decreasing the voltage of the pumping node P(i+1).

In the example pre-charge operations, if the voltage of the output node N(i) is equal, or substantially equal, to the voltage of the output node N(i+1), the connection between the two output nodes N(i) and N(i+1) may be active. In example embodiments of the present invention, the pumping capacitor Cp, a first parasitic capacitor Cc, and a second parasitic capacitor Cs may be connected in parallel, and the capacitance and/or the amount of shared charge may increase. For example, in parallel the capacitance of one charge pump cell may be Cc+Cp//Cs(Cc+(Cp*Cs)/(Cp+Cs)), for example, when the connection between the two output nodes N(i) and N(i+1) is inactive, whereas the capacitance may be Cc+Cp+Cs when the connection between the two output nodes N(i) and N(i+1) may be active.

In another example with regard to FIG. 7, the amount of charge shared during the change of the voltage of the pumping node P(i) from 0V to 0.5V, may be 0.5V×(Cc+Cp//Cs), for example, since the connection between the two output nodes N(i) and N(i+1) may be inactive. The amount of charge shared during the change of the pumping node P(i) from 0.5V to 1V may be Cc+Cp+Cs, for example, since the connection between the two output nodes N(i) and N(i+1) is active.

In example embodiments of the present invention, a threshold voltage may exist between the two output nodes N(i) and N(i+1). For example, the diode 74 may have a threshold voltage of about 0.5V, for example, if the diode 74 includes one transistor. In this example, the diode 74 may be inactive, for example, while the voltage of the pumping node P(i) increases from 0V to 0.75V, the voltage of the output node N(i) increases from 7V to 7.75V, and the voltage of the output node N(i+1) decreases from 8V to 7.25V. The diode 74 may be active, for example, while the voltage of the pumping node P(i) increases from 0.75V to 1V. In this example the amount of charge shared during the pre-charge operation in the circuit of FIG. 7 may become 0.75V×(Cc+Cp//Cs) while the voltage of the pumping node P(i) increases from 0V to 0.75V, for example, since the connection between the two output nodes N(i) and N(i+1) is inactive. The amount of charge shared during the pre-charge operation in the circuit of FIG. 7 may become 0.25V×(Cc+Cp+Cs) while the voltage of the pumping node P(i) increases from 0.75V to 1V, for example, since the connection between the two output nodes N(i) and N(i+1) is active.

As discussed above, in related art pre-charge operations, the amount of charge shared may be ½×Vdd(Cc+Cp//Cs), for example, since the connection between the two output nodes N(i) and N(i+1) is inactive. Since the capacitance of the parasitic capacitor Cs may be less than the capacitance of the pumping capacitor Cp, the amount of shared charge may become 1V×(Cc+Cs).

In the example pre-charge operations performed by, for example, charge pump circuits according to example embodiments of the present invention, the amount of shared charge may be 0.5V(Cc+Cp//Cs)+0.5V(Cc+Cp+Cs). Similarly, since the capacitance of the parasitic capacitor Cs is less (e.g., substantially less) than the capacitance of the pumping capacitor Cp, the amount of shared charge may be 0.5V(Cc+Cs)+0.5V(Cc+Cp+Cs). The amount of shared charge may increase by, for example, 0.5V×Cp relative to related art charge pump circuits. Considering the threshold voltage between the two output nodes N(i) and N(i+1), the amount of shared charge may increase by 0.25V×Cp relative to the related prior art and may be 0.75V(Cc+Cs)+0.25V(Cc+Cp+Cs).

In example embodiments of the present invention, the capacitance of the pumping capacitor Cp may be greater (e.g., substantially greater) than the capacitance of the parasitic capacitors Cs and Cc and the rate of increase of shared charge may be greater (e.g., substantially greater) in example embodiments of the present invention relative to that in the related art.

In example embodiments of the present invention, since the charge shared in the pre-charge operation of the charge pump circuit 70 may be excluded from the charge consumed in the charge and/or discharge operation, the increase of charge shared in the pre-charge operation may result in less charge consumed in the charge and/or discharge operation of the charge pump circuit 70. For example, in the charge pump circuit 70 according to an example embodiment of the present invention, the charge consumption may be reduced by 0.5V×Cp or 0.25V×Cp per charge pump cell, relative to the related art.

The amount of reduced charge consumption, for example, in a pre-charge operation of the charge pump circuit 70 will now be described, relative to the related art.

If the voltage of the pumping node P(i) increases from 0V to Vdd/2, the voltage of the output node N(i) may increase from Vpp−α to Vpp−α+Vdd/2. If the voltage of the pumping node P(i+1) decreases from Vdd to Vdd/2, the voltage of the output node N(i+1) may decrease from Vpp to Vpp−Vdd/2. Since the connection between the two output nodes N(i) and N(i+1) is active, the voltages of the two output nodes N(i) and N(i+1) may be the mean (e.g., average) of the two voltages, {(Vpp−α+Vdd/2)+(Vpp−Vdd/2)}/2 or Vpp−α/2.

In example embodiments of the present invention, when the pumping capacitor Cp connected to the output node N(i) is also connected to the output node N(i+1) the amount of charge may be (Vpp−α+Vdd/2)−(Vpp−α/2). The amount of shared charge obtained by the capacitors connected to the output node N(i) may be obtained by {the charge of Cc}+{the charge remaining, for example, after the charge moves from N(i) to N(i+1)}+{the charge moved from N(i) to N(i+1)}, i.e., {Cc×Vdd/2}+{Cp//Cs×α/2}+{[Cp//(2×Cp+2×Cs)]×(Vdd/2−α/2)}. In this example, since the capacitance of the pumping capacitor Cp is greater (e.g., substantially greater) than the capacitance of the parasitic capacitors Cs and Cc, the amount of shared charge may become {Cc×Vdd/2}+{Cs×α/2}+{Cp×(Vdd−α)/3}.

In the charge pump circuit 70, if the output voltage is Vpp, the pumping voltage is Vdd, and the number of charge pump cells is N, the voltage difference between each output node and each pumping node may be (Vpp−Vdd)/N, for example, in a quasi-static state. Since α=2×(Vpp−Vdd)/N, the amount of reduced charge consumption of each charge pump cell may be {Cc×Vdd/2}+{Cs×(Vpp−Vdd)/N}+{Cp×{(N+2)×Vdd−2×Vpp}/(3×N)}. The charge pumping efficiency E may be equal to the amount of output charge/the amount of consumed charge and the charge pumping efficiency E in the related art may be obtained by E≈[{(N+1)×Vdd−Vpp}/N]/[N×Vdd]. In example embodiments of the present invention, the amount of charge consumption may be reduced through the pre-charge operation of the charge pump circuit 70 and the charge pumping efficiency E may be obtained by E≈[{(N+1)×Vdd−Vpp}/N]/[N×Vdd−{(N+2)×Vdd−2×Vpp}/3]. In example embodiments of the present invention, the charge pump efficiency may be greater, or substantially greater, than the related art charge pumping efficiency.

Figure 8:
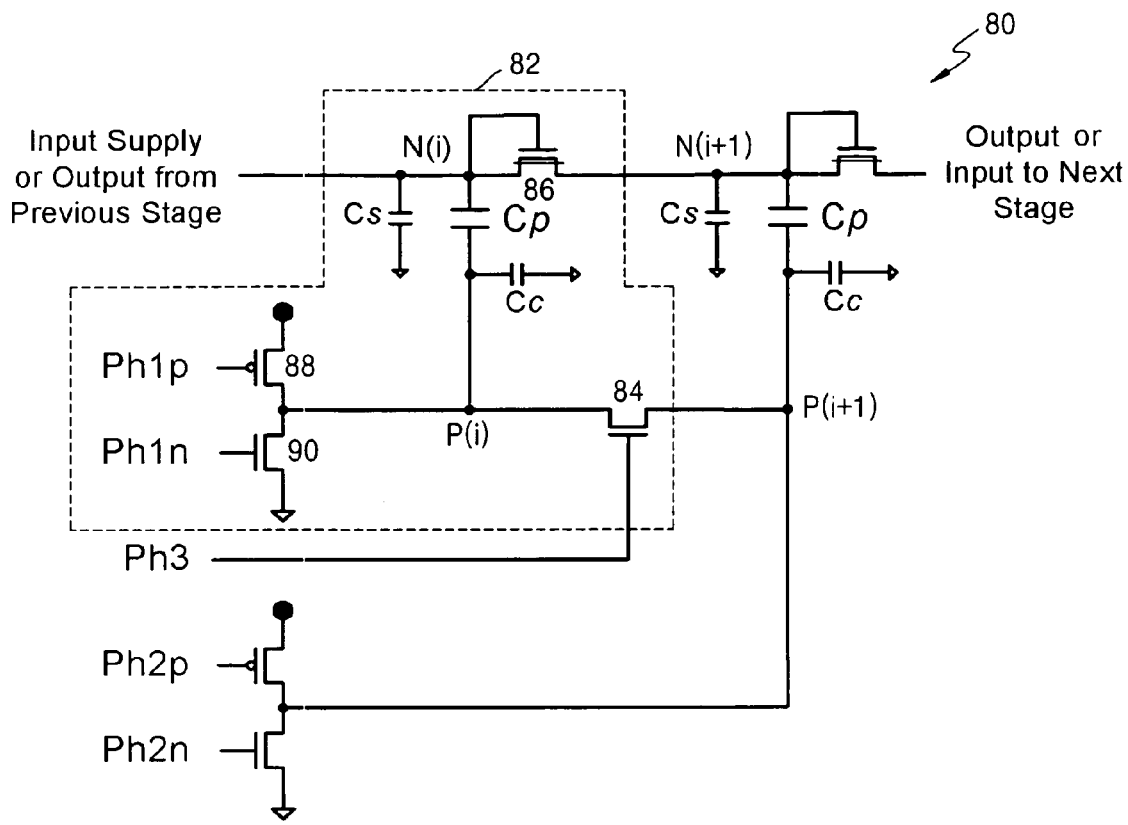
FIG. 8 is a circuit diagram of a charge pump circuit according to another example embodiment of the present invention.
Figure 9:
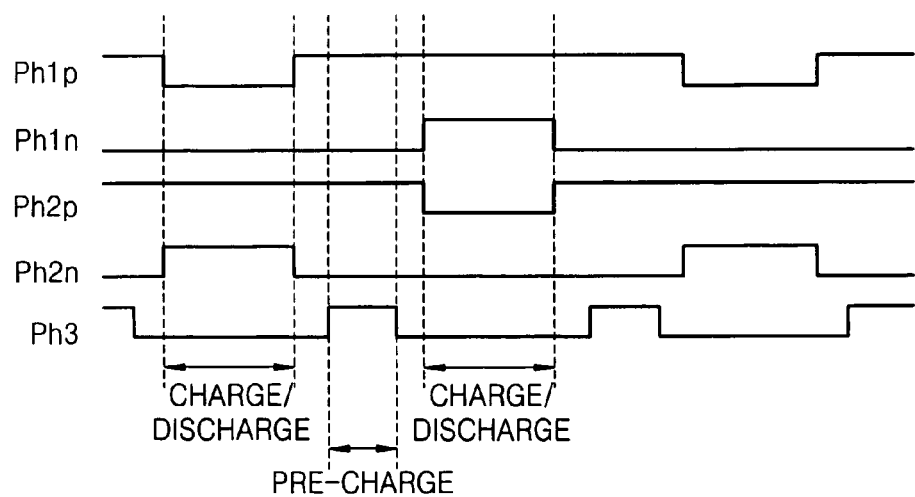
FIG. 9 is a timing diagram of clock signals for driving a charge pump circuit according to an example embodiment of the present invention.

FIG. 8 is a circuit diagram of a charge pump circuit according to another example embodiment of the present invention. FIG. 9 is a timing diagram of clock signals for driving the charge pump circuit 80 shown in FIG. 8.

Referring to FIG. 8, the charge pump circuit 80 may include a plurality of charge pump cells connected, for example, in series. In an ith charge pump cell 82, a pumping capacitor Cp may be included between a pumping node P(i), to which a pumping voltage may be supplied, and an output node N(i), from which a higher voltage may be generated, a first parasitic capacitor Cc may be connected to the pumping capacitor Cp, and a second parasitic capacitor Cs may be connected to the output node N(i). A pre-charge transistor 84 for performing a pre-charge operation may be connected between the pumping node P(i) of the ith charge pump cell 82 and a pumping node P(i+1) of an (i+1)th charge pump cell. A charge transfer transistor 86 may be connected between the output node N(i) of the ith charge pump cell 82 and an output node N(i+1) of the (i+1)th charge pump cell, and a gate of the charge transfer transistor 86 may be connected to the output node N(i). In this example embodiment of the present invention, the charge transfer transistor 86 may perform the function of a diode, for example, similar to the diode 74 of FIG. 7.

The pumping node P(i) may be pumped by two pumping signals Ph1p and Ph1n, which may be input to a transistor (e.g., PMOS transistor) 88 and a transistor (e.g., NMOS transistor) 90, respectively, and may supply (e.g., selectively supply) Vdd and 0V to the pumping node P(i).

An example operation of the charge pump circuit 80 will now be described with regard to FIGS. 8 and 9. In an example charge operation, when the two pumping signals Ph1p and Ph1n of the ith charge pump cell 82 are at a lower level, the transistor 88 may be active (e.g., turned on), and the transistor 90 may be inactive (e.g., turned off). The pumping node P(i) may be pumped to the Vdd level, and the pumping capacitor Cp connected to the pumping node P(i) may be charged by Vdd. Concurrently, the neighboring (e.g., adjacent) (i+1)th charge pump cell may perform a discharge operation in opposition to the ith charge pump cell 82.

In another example pre-charge operation (e.g., which may be subsequent to the above charge operation), the clock signal Ph1p supplied to the transistor 88 may be at a higher level, and the clock signal Ph1n supplied to the transistor 90 may be at a lower level. The two transistors 88 and 90 may be inactive. A pre-charge clock signal Ph3 may be enabled, and the pre-charge transistor 84 may be active. The example pre-charge operation may be performed by sharing the charge of the pumping capacitor Cp connected to the pumping node P(i) with a pumping capacitor Cp of the neighboring (i+1)th charge pump cell.

When the two pumping signals Ph1p and Ph1n of the ith charge pump cell 82 are at a higher level, the transistor 88 may be inactive, and the transistor 90 may be active. The pumping node P(i) may become 0V, the pumping capacitor Cp connected to the pumping node P(i) may be discharged, and the neighboring (i+i)th charge pump cell may perform the charge operation.

Figure 10:
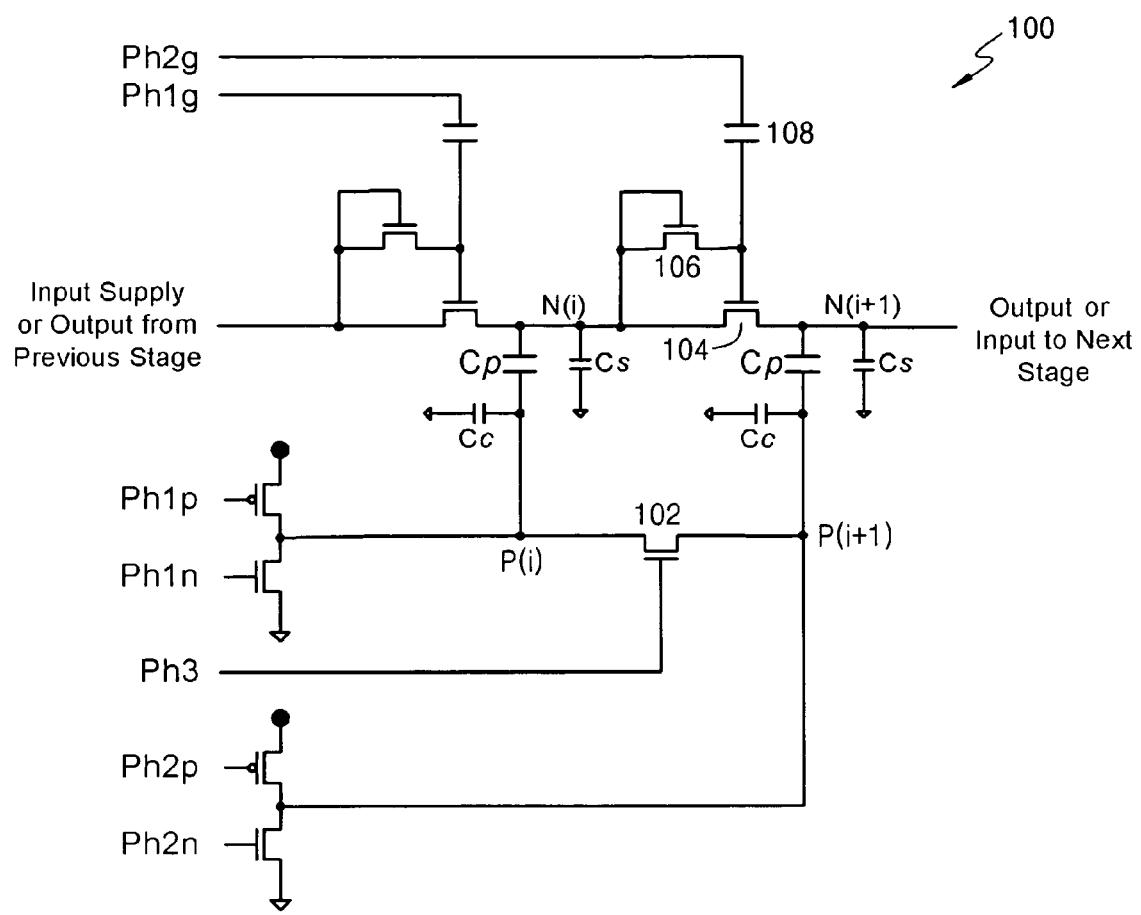
FIG. 10 is a circuit diagram of a charge pump circuit according to another example embodiment of the present invention.
Figure 11:
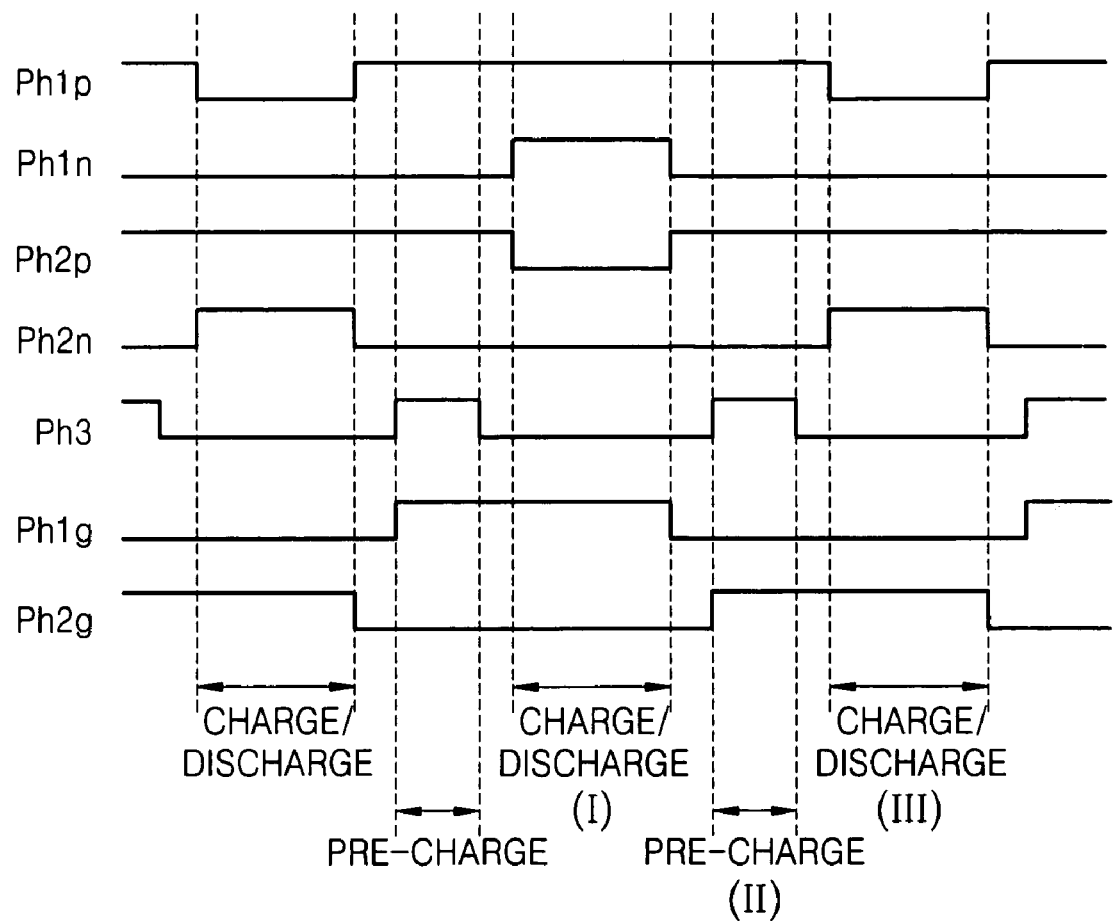
FIG. 11 is a timing diagram of clock signals for driving a charge pump circuit according to an example embodiment of the present invention.

FIG. 10 is a circuit diagram of a charge pump circuit according to another example embodiment of the present invention. FIG. 11 is a timing diagram of clock signals for driving the charge pump circuit 100 shown in FIG. 10.

The charge pump circuit 100 of FIG. 10 may increase the amount of charge shared in a pre-charge operation, for example, by reducing the threshold voltage between the two output nodes N(i) and N(i+1).

Referring to FIG. 10, a first transistor (e.g., NMOS transistor) 102 for pre-charge may be connected between two pumping nodes P(i) and P(i+1), and a second transistor (e.g., NMOS transistor) 104 for charge transfer may be connected between the two output nodes N(i) and N(i+1). A third transistor (e.g., NMOS transistor) 106 may be connected between the output node N(i) of an ith charge pump cell and the second transistor 104, and a gate of the third transistor 106 may be connected to the output node N(i) of an ith charge pump cell. A capacitor 108 may be connected between a gate of the second transistor 104 and a clock signal Ph2g.

An example operation of the charge pump circuit 100 will now be described with regard to FIGS. 10 and 11. In an example charge and discharge operation (I), in which the ith charge pump cell may be discharged and an (i+1)th charge pump cell may be charged, the clock signal Ph2g input to the gate of the second transistor 104 may be at a lower level. The connection between the two output nodes N(i) and N(i+1) may be inactive.

In an example pre-charge operation (II), the clock signal Ph2g input to the gate of the second transistor 104 may be at a higher level. The connection between the two output nodes N(i) and N(i+1) may be active, the third transistor 106 may be active, and the voltage difference between the gate of the second transistor 104 and the source of the second transistor 104 may be constant, or substantially constant, using, for example, a diode drop. In example embodiments of the present invention, regardless of the threshold voltage of the second transistor 104, if the voltages of the two output nodes N(i) and N(i+1) are the same, or substantially the same, the connection between the two output nodes N(i) and N(i+1) may be active. This may result in a more effective threshold voltage of 0V, which may increase the amount of charge shared in the pre-charge operation, according to example embodiments of the present invention.

Figure 12:
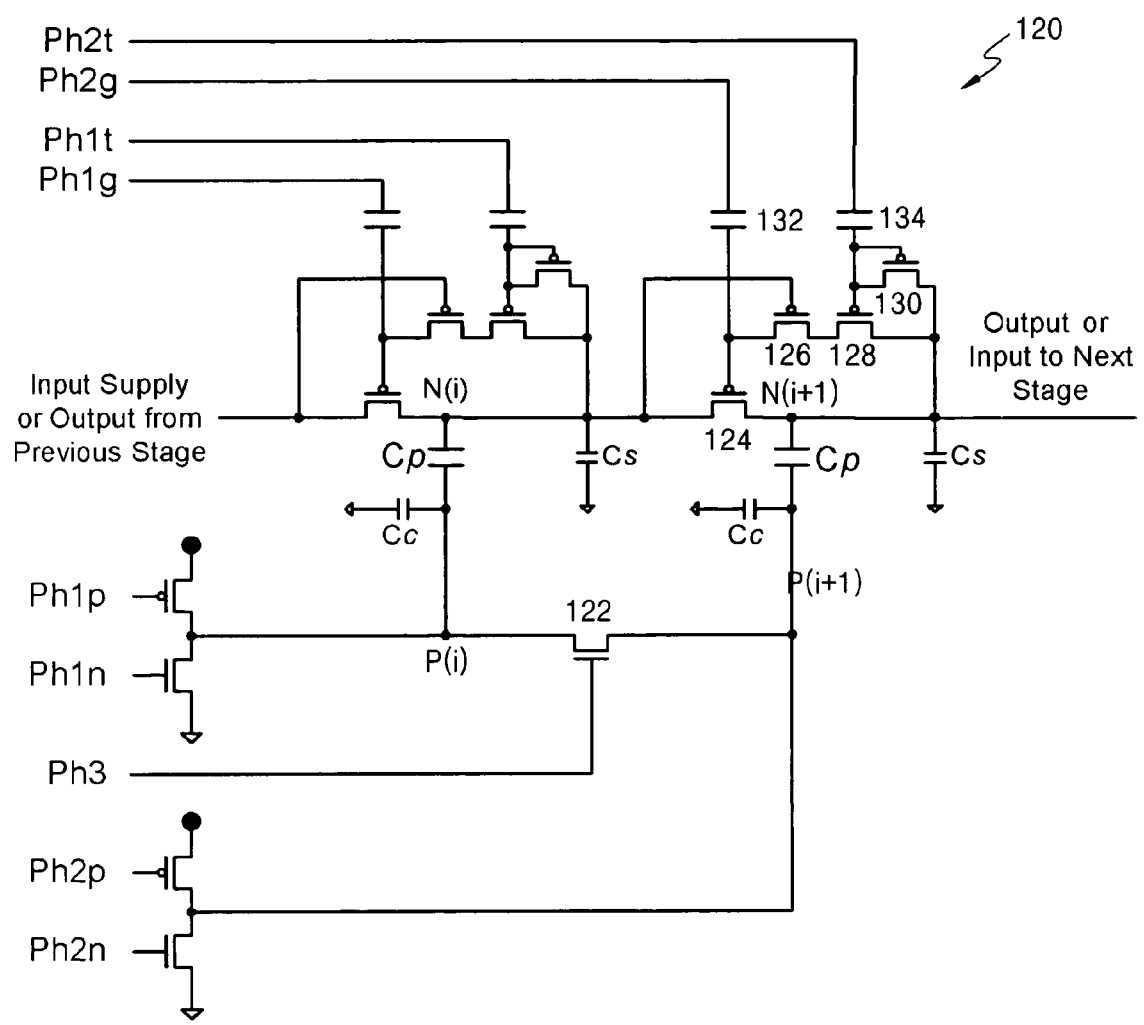
FIG. 12 is a circuit diagram of a charge pump circuit according to another example embodiment of the present invention.
Figure 13:
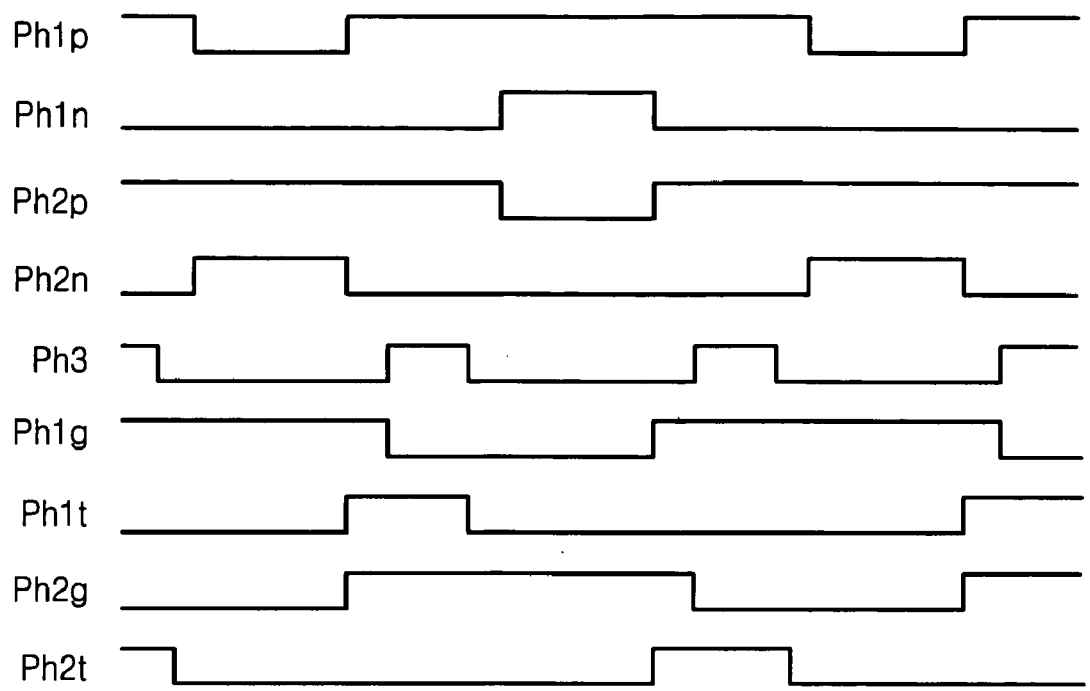
FIG. 13 is a timing diagram of clock signals for driving a charge pump circuit according to an example embodiment of the present invention.

FIG. 12 is a circuit diagram of a charge pump circuit according to another example embodiment of the present invention. FIG. 13 is a timing diagram of clock signals for driving the charge pump circuit 120 shown in FIG. 12.

The charge pump circuit 120 shown in FIG. 12 may be obtained by using a charge pump circuit including, for example, PMOS transistors. Referring to FIG. 12, a transistor (e.g., NMOS transistor) 122 for pre-charge may be connected between two pumping nodes P(i) and P(i+1), and a first transistor (e.g., PMOS transistor) 124 for charge transfer may be connected between two output nodes N(i) and N(i+1). A first capacitor 132 may be connected between a gate of the first transistor 124 and a clock signal Ph2g. Second and third transistors (e.g., PMOS transistors) 126 and 128 may be connected, for example, in series between the gate of the first transistor 124 and the output node N(i+1). A gate of the second transistor 126 may be connected to the output node N(i). A fourth transistor (e.g., PMOS transistor) 130 may be connected between a gate of the third transistor 128 and the output node N(i+1). The gates of the third and fourth transistors 128 and 130 may both be connected to a clock signal Ph2*t* through a second capacitor 134.

Figure 14:
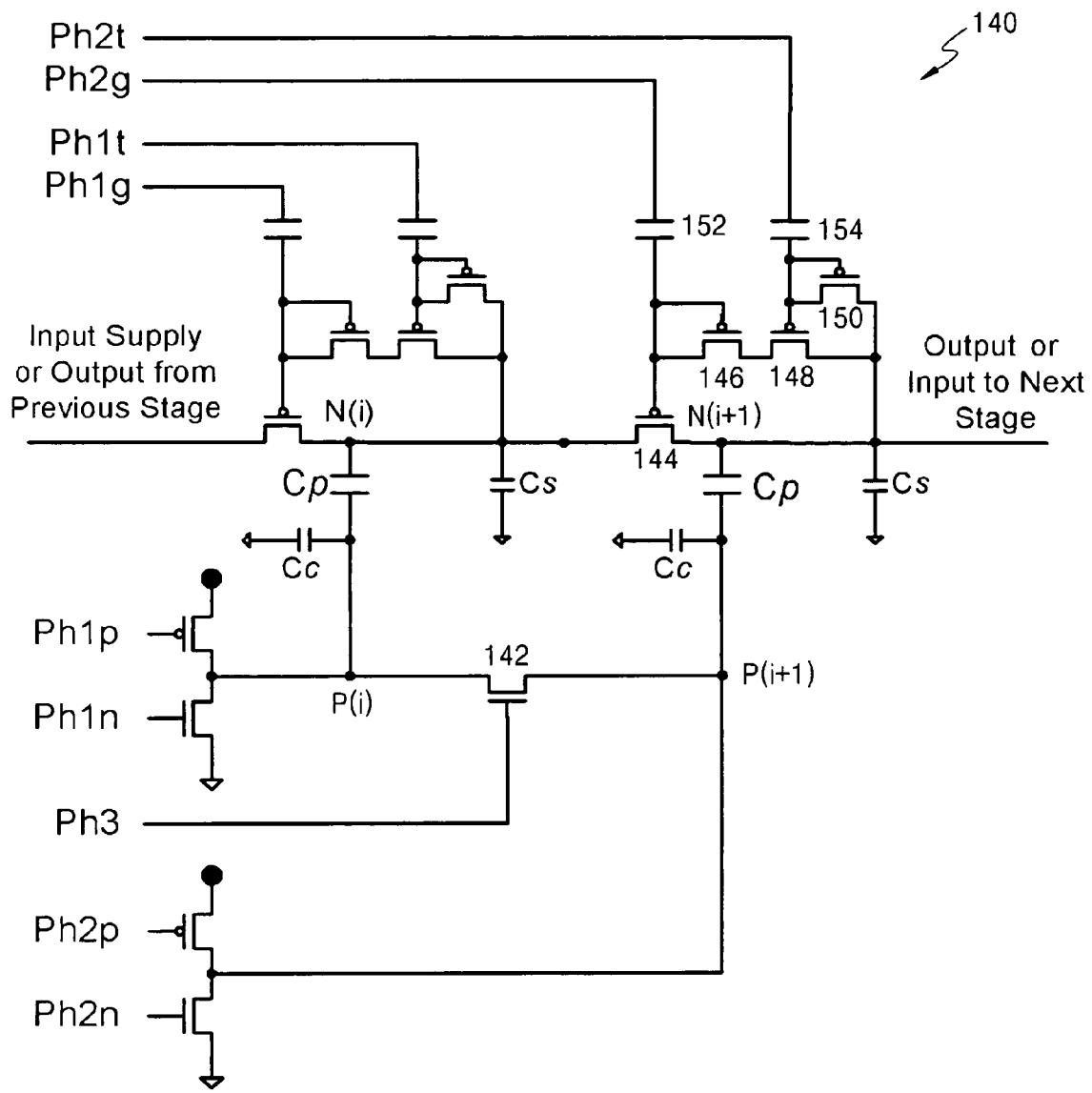
FIG. 14 is a circuit diagram of a charge pump circuit according to another example embodiment of the present invention.
Figure 15:
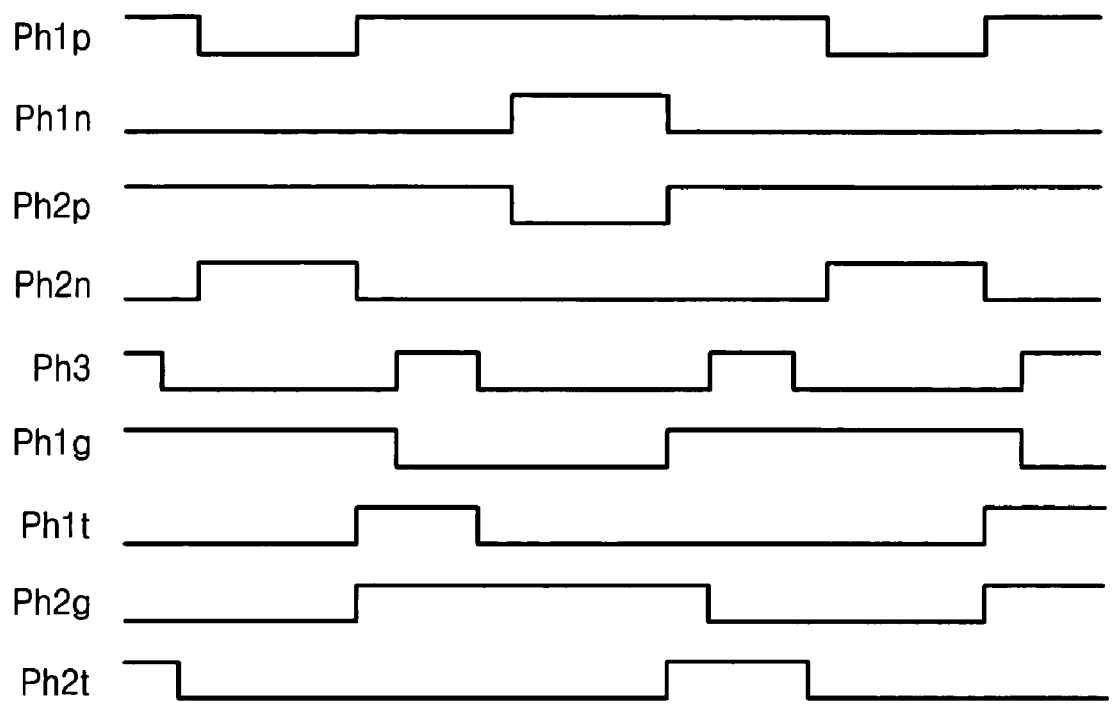
FIG. 15 is a timing diagram of clock signals for driving a charge pump circuit according to an example embodiment of the present invention.

FIG. 14 is a circuit diagram of a charge pump circuit according to another example embodiment of the present invention. FIG. 15 is a timing diagram of clock signals for driving the charge pump circuit 140 shown in FIG. 14.

In the charge pump circuit 140 shown in FIG. 14, charge may be shared, for example, regardless of the threshold voltage of the charge transfer transistor (e.g., PMOS transistor of the charge pump circuit 120 shown in FIG. 12. For example, the charge pump circuit 140 shown in FIG. 14 may combine any or all aspects of example embodiments of the present invention as illustrated in FIG. 10 and/or FIG. 12.

Referring to FIG. 14, a transistor (e.g., NMOS transistor) 142 for pre-charge may be connected between two pumping nodes P(i) and P(i+1), and a first transistor (e.g., PMOS transistor) 144 for charge transfer may be connected between two output nodes N(i) and N(i+1). Second and third transistors (e.g., PMOS transistors) 146 and 148 may be connected, for example, in series between a gate of the first transistor 144 and the output node N(i+1). A first capacitor 152 may be connected between the gate of the first transistor 144 and a clock signal Ph2*g*. A gate of the second transistor 146 may be connected to the gate of the first transistor 144, and a fourth transistor (e.g., PMOS transistor) 150 may be connected between a gate of the third transistor 148 and the output node N(i+1). The gates of the third and fourth transistors 148 and 150 may be connected to a clock signal Ph2*t* through a second capacitor 154.

Example embodiments of the present invention may provide a charge pump circuit, which may reduce the amount of charge consumed in a charge/discharge operation by performing a pre-charge operation between charge/discharge operations. The consumed amount of charge may be further reduced by increasing the amount of charge shared in the pre-charge operation. For example, the charge pump circuit may increase the amount of shared charge by connecting a pumping capacitor and parasitic capacitors in parallel, and/or transferring the charge in a direction from an output node having a higher voltage to an output node having a lower voltage.

As described above, unlike related art charge consumption reduction methods, which may only reduce the charge consumed in a stray capacitance of a pumping capacitor, example embodiments of the present invention may provides methods may improve pumping efficiency using, for example, a clock scheme, which may also reduce charge of all, or substantially all, capacitors connected to two nodes for charge transfer in a pumping operation.

Example embodiments of the present invention have been described with regard to specific aspects, such as PMOS and NMOS transistors. However, it will be understood that these aspects may be interchangeable and/or combinable in any suitable manner.

Charge pump circuits according to example embodiments of the present invention may also or alternatively reduce charge consumption.

While example embodiments of the present invention have been particularly shown and described, it will be understood by those of ordinary skill in the art that various changes in form and details may be made therein without departing from the spirit and scope of the present invention as defined by the following claims.

What is claimed is:

1. A charge pump circuit including a plurality of charge pump cells, at least one of the plurality of charge pump cells comprising:
    a first output node for transferring charge;
    a first pumping node for receiving a pumping clock signal;
    a first capacitor connected between the first output node and the first pumping node, for storing the charge, and repeating a charge, discharge or pre-charge operation in response to a plurality of pumping clock signals;
    a first transistor connected between the first output node and a second output node, the first transistor selectively activating and deactivating in response to a first clock signal;
    a first transistor connection selectively connecting the first clock signal to the second output node, the transistor connection selectively activating and deactivating in response to at least a second clock signal; and
    a second transistor connection selectively connecting the second clock signal to the second output node, the transistor connection selectively activating and deactivating in response to at least the second clock signal.

2. The charge pump circuit of claim 1, wherein the charge transfer is performed by activating the first transistor connected between the first output node and the second output node when the voltage of the first output node is equal to the voltage of the second output node.

3. The charge pump circuit of claim 1, wherein the first transistor connected between the first output node and the second output node is deactivated during the charge and discharge operation.

4. The charge pump circuit of claim 1, wherein the first pumping node and a second pumping node are connected using a switch, which is activated in the pre-charge operation and deactivated in the charge and discharge operations.

5. The charge pump circuit of claim 4, wherein the switch includes a second transistor which responds to a clock signal enabled in the pre-charge operation.

6. The charge pump circuit of claim 2, wherein a gate of the first transistor is connected to the first clock signal.

7. The charge pump circuit of claim 6, wherein the first transistor is a PMOS transistor.

8. The charge pump circuit of claim 4, wherein the charge pump circuit performs the charge or discharge operations in response to the pumping clock signal input to the first pumping node, and performs the pre-charge operation in response to a pre-charge clock signal input to the switch.

9. The charge pump circuit of claim 1, wherein at least one of the plurality of charge pump cells further includes,
    a second transistor connected between the first pumping node and a second pumping node and responds to a clock signal enabled during the pre-charge operation, and
    the first transistor connection having a third transistor and a fourth transistor connected between a gate of the first transistor and the second output node.

10. The charge pump circuit of claim 9, wherein the first transistor is a PMOS transistor and the second transistor is an NMOS transistor.

11. The charge pump circuit of claim 9, wherein the at least one of the plurality of charge pump cells further includes a second capacitor connected to the gate of the first transistor.

12. The charge pump circuit of claim 11, wherein the third and fourth transistors are PMOS transistors.

13. The charge pump circuit of claim 1, wherein at least one of the plurality of charge pump cells further includes, a second transistor connected between the first pumping node and a second pumping node and responding to a clock signal enabled in the pre-charge operation,
a second capacitor connected to a gate of the first transistor,
the first transistor connection having a third transistor and a fourth transistor connected in series between the gate of the first transistor and the second output node,
the second transistor connection having a fifth transistor connected between a gate of the fourth transistor and the second output node, and
a third capacitor connected to the gate of the fourth transistor, and wherein
  a gate of the third transistor is connected to the first output node, and a gate of the fifth transistor is connected to the gate of the fourth transistor.

14. The charge pump circuit of claim 13, wherein the first, third, fourth and fifth transistors are PMOS transistors.

15. The charge pump circuit of claim 1, wherein at least one of the plurality of charge pump cells further includes,
a second transistor connected between the first pumping node and a second pumping node and responding to a clock signal enabled in the pre-charge operation,
a second capacitor connected to a gate of the first transistor,
the first transistor connection having a third transistor and a fourth transistor connected in series between the gate of the first transistor and the second output node,
the second transistor connection having a fifth transistor connected between a gate of the fourth transistor and the second output node, and
a third capacitor connected to the gate of the fourth transistor, and wherein
  a gate of the third transistor is connected to the gate of the first transistor, and a gate of the fifth transistor is connected to the gate of the fourth transistor.

16. A method comprising:
activating a connection between a first pumping node in a first charge pump cell and a second pumping node in a second charge pump cell in response to a pre-charge enable clock signal;
varying the voltage of a first output node by charging a first pumping capacitor using charge transferred through the first pumping node;
selectively activating and deactivating a first connection between a first output node in the first charge pump cell and a second output node in the second charge pump cell in response to a first clock signal;
selectively activating and deactivating a second connection to the second output node in response to at least a second clock signal, the second connection connecting the first clock signal to the second output node;
selectively activating and deactivating a third connection to the second output node in response to at least the second clock signal, the third connection connecting the second clock signal to the second output node; and
transferring the charge through the first and second output nodes.

17. The method of claim 16, further including,
disabling the pre-charge enable signal, and
charging or discharging the pumping capacitor in response to a pumping clock signal.

18. A charge pump cell for use in a charge pump circuit, the charge pump cell comprising:
a first output node for transferring charge;
a first pumping node for receiving a pumping clock signal;
a first capacitor connected between the first output node and the first pumping node, for storing the charge, and repeating a charge, discharge or pre-charge operation in response to a plurality of pumping clock signals;
a first transistor connected between the first output node and a second output node, the first transistor selectively activating and deactivating in response to a first clock signal;
a first transistor connection selectively connecting the first clock signal to the second output node, the transistor connection selectively activating and deactivating in response to at least a second clock signal; and
a second transistor connection selectively connecting the second clock signal to the second output node, the transistor connection selectively activating and deactivating in response to at least the second clock signal.

19. The charge pump cell of claim 18, further including,
a second transistor connected between the first pumping node and the second pumping node and responding to a clock signal enabled during the pre-charge operation, and
the first transistor connection having a third transistor and a fourth transistor connected between a gate of the first transistor and the second output node.

20. The charge pump cell of claim 19, further including,
the second transistor connection having a fifth transistor connected between the second output node and a gate of the fourth transistor; and
a second capacitor connected to the gate of the first transistor.

21. The charge pump cell of claim 18, further including,
a second transistor connected between the first pumping node and a second pumping node and responding to a clock signal enabled in the pre-charge operation,
a second capacitor connected to a gate of the first transistor,
the first transistor connection having a third transistor and a fourth transistor connected in series between the gate of the first transistor and the second output node,
the second transistor connection having a fifth transistor connected between a gate of the fourth transistor and the second output node, and
a third capacitor connected to the gate of the fourth transistor, and wherein
  a gate of the third transistor is connected to the first output node, and a gate of the fifth transistor is connected to the gate of the fourth transistor.

22. The charge pump cell of claim 18, further including,
a second transistor connected between the first pumping node and a second pumping node and responding to a clock signal enabled in the pre-charge operation,
a second capacitor connected to a gate of the first transistor,
the first transistor connection having a third transistor and a fourth transistor connected in series between the gate of the first transistor and the second output node,
the second transistor connection having a fifth transistor connected between a gate of the fourth transistor and the second output node, and
a third capacitor connected to the gate of the fourth transistor, and wherein
  a gate of the third transistor is connected to the gate of the first transistor, and a gate of the fifth transistor is connected to the gate of the fourth transistor.

23. A charge pump circuit adapted to perform the method of claim 16.

24. A charge pump circuit including a plurality of charge pump cells according to claim 18.

25. A charge pump circuit including a plurality of charge pump cells, each of the plurality of charge pump cells comprising:

a first output node for transferring charge;

a first pumping node for receiving a clock signal; and a capacitor connected between the first output node and the first pumping node, for storing the charge, and repeating a charge, discharge or pre-charge operation in response to a plurality of clock signals; wherein the pre-charge operation includes a unidirectional charge transfer performed from the first output node to a second output node, and at least one of the plurality of charge pump cells further includes, a first transistor connected between the first pumping node and a second pumping node and responding to a clock signal enabled in the pre-charge operation, a second transistor connected between the first output node and the second output node, a second capacitor connected to a gate of the second transistor, a third transistor and a fourth transistor connected in series between the gate of the second transistor and the second output node, a fifth transistor connected between a gate of the fourth transistor and the second output node, and a third capacitor connected to the gate of the fourth transistor, wherein a gate of the third transistor is connected to the first output node, and a gate of the fifth transistor is connected to the gate of the fourth transistor.

26. The charge pump circuit of claim 25, wherein the second, third, fourth and fifth transistors are PMOS transistors.

27. A charge pump circuit including a plurality of charge pump cells, each of the plurality of charge pump cells comprising:

a first output node for transferring charge;

a first pumping node for receiving a clock signal; and a capacitor connected between the first output node and the first pumping node, for storing the charge, and repeating a charge, discharge or pre-charge operation in response to a plurality of clock signals; wherein the pre-charge operation includes a unidirectional charge transfer performed from the first output node to a second output node, and at least one of the plurality of charge pump cells further includes, a first transistor connected between the first pumping node and a second pumping node and responding to a clock signal enabled in the pre-charge operation, a second transistor connected between the first output node and the second output node, a second capacitor connected to a gate of the second transistor, a third transistor and a fourth transistor connected in series between the gate of the second transistor and the second output node, a fifth transistor connected between a gate of the fourth transistor and the second output node, and a third capacitor connected to the gate of the fourth transistor, and wherein a gate of the third transistor is connected to the gate of the second transistor, and a gate of the fifth transistor is connected to the gate of the fourth transistor.

28. A charge pump cell for use in a charge pump circuit, the charge pump cell comprising:

a first output node for transferring charge;

a first pumping node for receiving a clock signal; and a capacitor connected between the first output node and the first pumping node, for storing the charge, and repeating a charge, discharge or pre-charge operation in response to a plurality of clock signals;

a first transistor connected between the first pumping node and a second pumping node and responding to a clock signal enabled in the pre-charge operation;

a second transistor connected between the first output node and the second output node;

a second capacitor connected to a gate of the second transistor, a third transistor and a fourth transistor connected in series between the gate of the second transistor and the second output node;

a fifth transistor connected between a gate of the fourth transistor and the second output node; and a third capacitor connected to the gate of the fourth transistor; wherein the pre-charge operation includes a unidirectional charge transfer performed from the first output node to a second output node, and a gate of the third transistor is connected to the first output node, and a gate of the fifth transistor is connected to the gate of the fourth transistor.

29. The charge pump cell of claim 28, further including, a first transistor connected between the first pumping node and a second pumping node and responding to a clock signal enabled in the pre-charge operation, a second transistor connected between the first output node and the second output node.

* * * * *